340-870.11 SR
XR 3,171,894
CROSS REFERENCE SEARCH ROOM
TX 7018 D

March 2, 1965 M. G. KAUFMAN ETAL 3,171,894

DATA TRANSMISSION SYSTEM

Filed Sept. 28, 1961 4 Sheets-Sheet 1

INVENTORS
MAXIME G. KAUFMAN
FRANCIS X. DOWNEY

BY Richard E. Reed
John E. Kidd
ATTORNEYS

3171894

March 2, 1965 M. G. KAUFMAN ETAL 3,171,894

DATA TRANSMISSION SYSTEM

Filed Sept. 28, 1961 4 Sheets-Sheet 2

INVENTORS
MAXIME G. KAUFMAN
FRANCIS X. DOWNEY

BY Richard H. Reed
John E. Kidd

ATTORNEYS

INVENTORS
MAXIME G. KAUFMAN
FRANCIS X. DOWNEY
Richard A. Reed
BY John E. Kidd
ATTORNEYS

INVENTORS
MAXIME G. KAUFMAN
FRANCIS X. DOWNEY

BY Richard C. Reed
John E. Kidd
ATTORNEYS

United States Patent Office 3,171,894
Patented Mar. 2, 1965

3,171,894
DATA TRANSMISSION SYSTEM

Maxime G. Kaufman, Camp Springs, Md., and Francis X. Downey, Annandale, Va., assignors to the United States of America as represented by the Secretary of the Navy
Filed Sept. 28, 1961, Ser. No. 141,550
18 Claims. (Cl. 179—2)
(Granted under Title 35, U.S. Code (1952), sec. 266)

The invention described herein may be manufactured and used by or for the Government of the United States of America for governmental purposes without the payment of any royalties thereon or therefor.

This invention relates generally to a multichannel communications system and more particularly to a system for continuously handling data information in real time while at the same time being capable of performing command, calibration and monitoring functions without significantly interrupting or interfering with the flow of data.

In the field of multichannel carrier systems for information transfer, the technique of FM telemetry is well known, however, various limitations are imposed upon the general application of this technique that restrict its overall application. As for example, a frequency of 960 c.p.s. transmitted from San Diego to Washington, D.C., may not be 960 c.p.s. upon arrival. This is due to frequency shift caused by the microwave links and other carrier systems that normally make-up a transcontinental telephone line. The more accuracy and stability required of information transfer, the more complex the equipment, the higher the quality of telephone lines that should be employed for transmission and the higher the cost.

The multichannel carrier system of this invention has been adapted for use with the Space Surveillance System which is described in the copending application of Roger L. Easton, Serial No. 99,637, filed on March 30, 1961. The surveillance system is employed for the detection and tracking of earth satellites and the computation of their orbital parameters. The system forms an electromagnetic energy fence which is developed by several complexes, located over a several thousand mile long arc on the earth's surface. Each complex is designed to receive sufficient data so as to determine a satellite's position in an east-west direction and as well as on a north-south plane as more fully described in the aforementioned Easton application. The problem was then present of analyzing, storing and processing the data information obtained by the surveillance system at a central control location. The data, from many remote sites which employ ordinary voice quality telephone links had to be handled simultaneously and in real time on a continuous, twenty-four hour a day basis. Because of the rigorous requirements and exacting nature of the data information being transmitted, the constancy and accuracy of the data information transferred is paramount, demanding rigid calibrating and monitoring functions while at the same time allowing only negligible loss of data information due to interference, interruption or failure of components in the system.

The problems have been overcome in this data transmission system which links the remote receiving sites of the space surveillance system to a centrally controlled data reduction site. Each remote site is coupled to the central site by a commercial, voice quality, duplex (two-way) telephone line which employs stndard FM telemetry techniques in order to transmit eight discreate channels of frequency modulated carriers on each telephone line. In addition to these FM data carriers, signals for monitoring, compensation and command functions are continuously being transmitted over the duplex line. The data for each remote site is assimilated at a central site on a real-time basis and used in this application for computing the orbital parameters of satellites detected by the surveillance system. The system utilizes full duplex telephone lines which enables signals to be both transmitted and received at the same time. Both the remote and the central sites employ equipment to enhance the operation of the voice quality lines and to insure that data will never be lost due to failure in the transmission media.

Accordingly, it is an object of the present invention to provide a multichannel communications system that can transmit data information continuously and in real time between multiple remote sites and a central control site and still maintain a high degree of accuracy and reliability in signal response.

It is also an object of this invention to provide a multichannel carrier system that will operate over duplex voice lines while providing sufficient monitoring means at each end of the system and yet maintain high information content and good resolution for data transmission.

Another object of this invention is to provide a system employing FM telemetry techniques that will minimize and substantially eliminate the loss of data information due to transmission line down time or in limitations imposed in transmission between the remote sites and the central site while at the same time being capable of compensating automatically for defects that may arise in the line.

Yet another feature of this invention is to provide a data transmission system wherein calibration techniques may be employed so as to hold the errors that may arise in the system to less than 2% without interfering with the detection or transmission of data information and to be able to control such calibration techniques either at the data generating site or remotely from a data reduction site.

Still another object is to provide a communication system wherein separate command information may be transmitted simultaneously with the data information for command and self checking functions at the receiving site of the system and at the same time being capable of compensating for any frequency shift that may occur in the transmission line.

A still further object of this invention is to provide a multichannel carrier system for connecting several remote locations to a central location which is capable for correlation purposes, of continuously monitoring in real time all of the data information received over the data system and still retain calibration and control functions between the respective locations.

Other objects and advantages of the invention will hereinafter become more fully apparent from the following description of the annexed drawings, which illustrate a preferred embodiment wherein.

Figure 1:
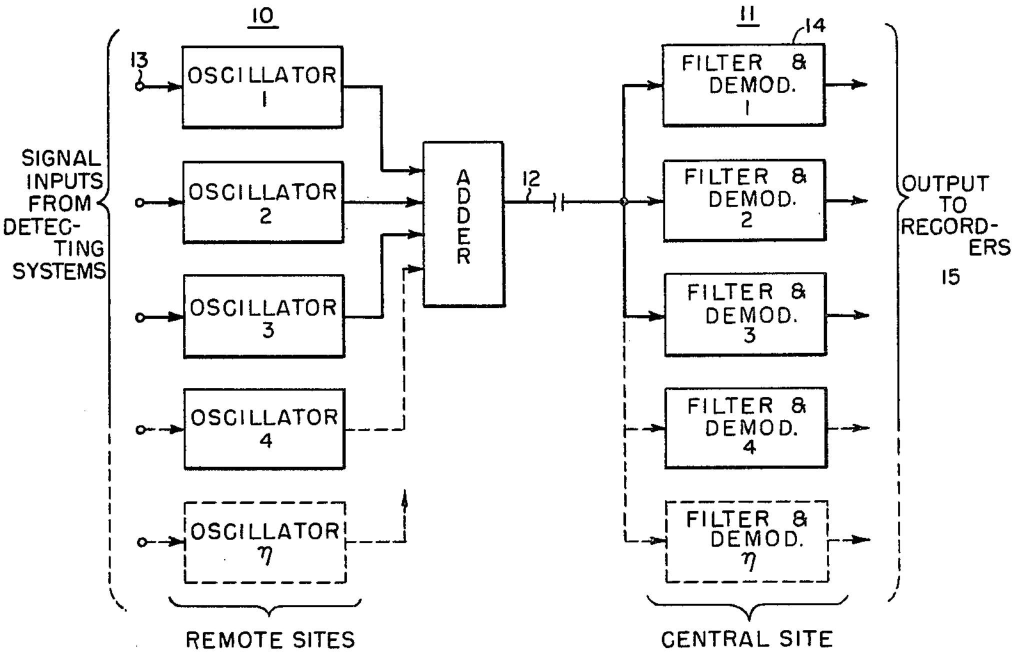
FIG. 1 is a block diagram of a basic multichannel data transmission system.
Figure 2:
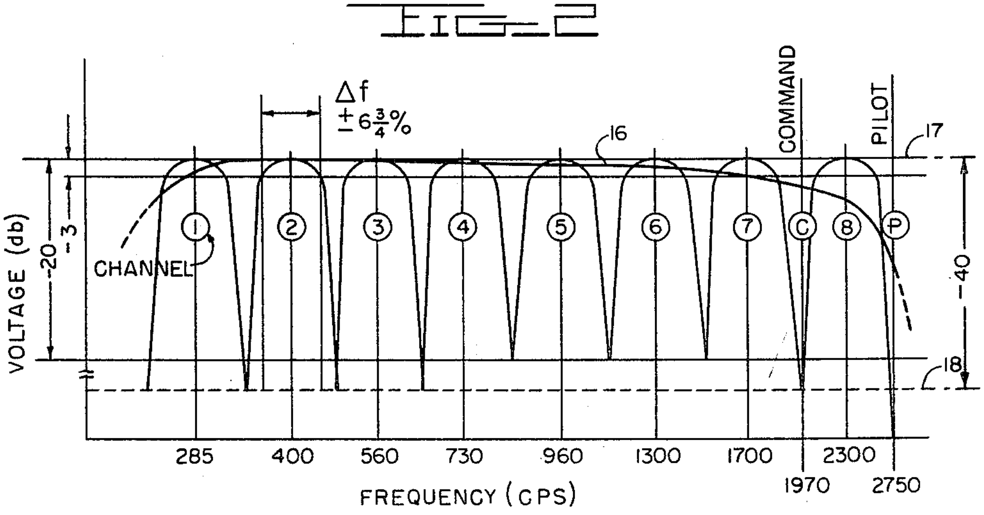
FIG. 2 is a graphic representation of the channel frequency allocations for one data line.

Referring now to the drawings and in particular to FIG. 1, wherein the basic instrumentation required for FM telemetry of data between the remote sites 10 and a central site 11 is shown. The system impresses carriers on connecting telephone line 12. These carriers, are frequency modulated by the data signals 13. Demodulators 14 are employed at the central location to detect and readout the data. The data transmitted is slowly varying, as for example when a radiating satellite signal is being monitored, so that the data may be permanently recorded on electromechanical paper strip recorders 15. By using different center frequencies, as shown in FIG. 2, a multiplicity of channels can be handled simultaneously on a single line. Here in FIG. 2, the telephone line frequency response 16 is shown as well as the eight carrier bandwidths which the data signals can occupy. While only eight channels have been shown, by employing transistorized crystal controlled equipment it is possible to substantially increase the number of channels.

The voltage amplitudes of each subcarrier channel 1 through 8 are plotted normalized to zero db at 17 while the crossing of the skirts for each subcarrier channel at the receiving filter will intersect at −20 db and adjacent channel crosstalk is below −40 db. Standard practice in FM telemetry is to use a deviation ratio of 5 for about ½ percent error in the data. As can be seen in FIG. 2, a deviation of ±6¾ percent of the carrier center frequency is being used for channels 2 through 8. This results in total deviations from 54 to 310 c.p.s. for the respective channels. Channel 1 uses a deviation of ±5¼ percent or 30 c.p.s. It should be appreciated that lower deviation ratios may be used but at the expense of the signal-to-noise ratio and an increase in harmonic distortion. The telephone line noise, shown by dotted line 18 usually runs at −40 db. Since the data signals are not continuous functions the upper corner frequency for each channel (−3 db) has been set at 22 c.p.s. at the output of the central site demodulators 14. This value will also allow reasonable bandwidth for monitoring an autocalibration signal which is of such short duration (0.2 second) that there is effectively no interference with the continual flow of data from the remote sites to the central site.

A pilot tone is illustrated by P at 2750 c.p.s. and a command frequency signal C is shown at 1970 c.p.s. The pilot tone is a single unmodulated frequency and is located at the upper end of the telephone line response. The pilot tone is down approximately 40 db with respect to the nearest channel frequency response, channel 8.

The command signal is also a single unmodulated frequency and is located between channel filters 7 and 8 so as not to interfere with either channel.

Figure 3:
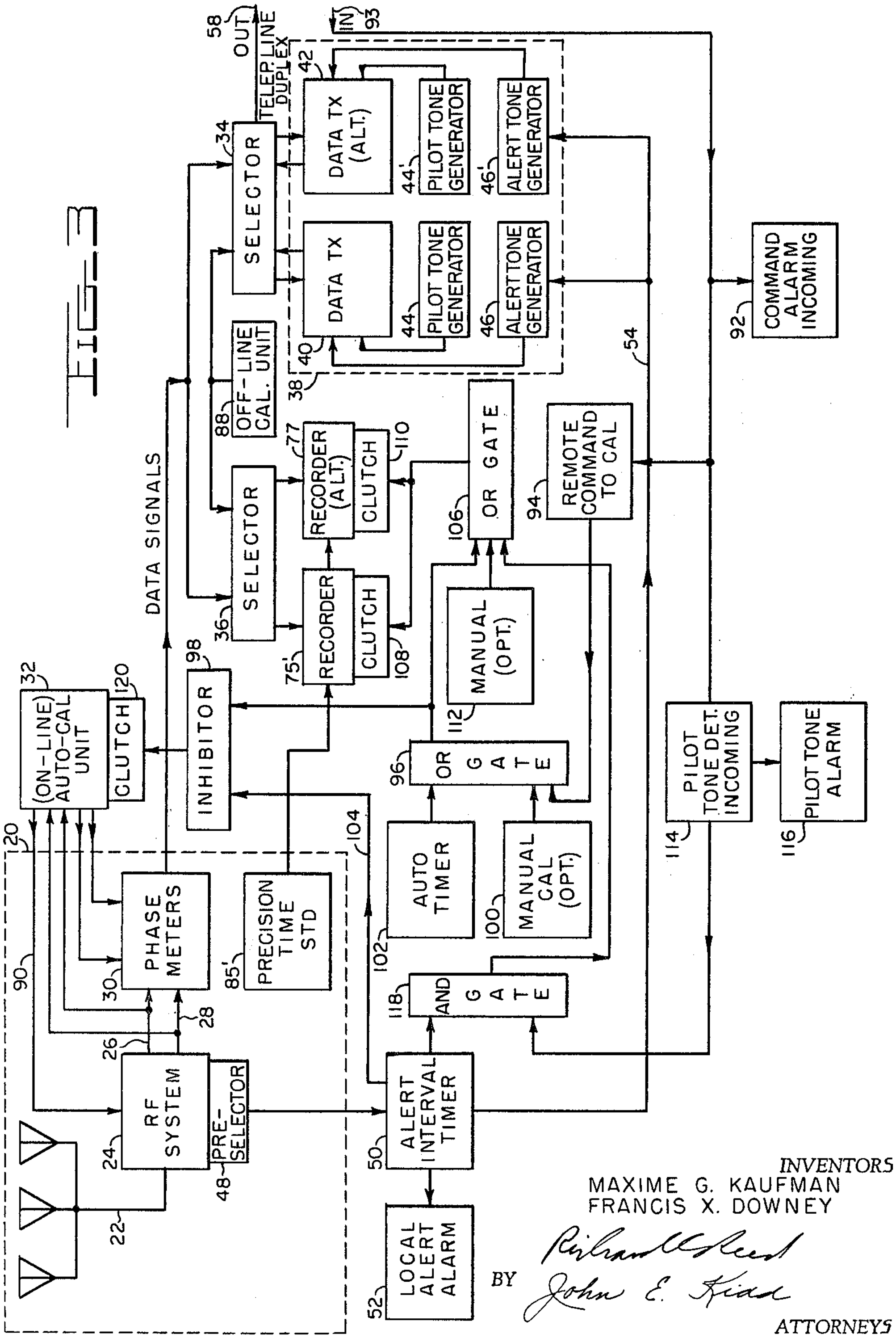
FIG. 3 is a logic diagram of the sending end for one data line according to the principles of this invention.
Figure 4:
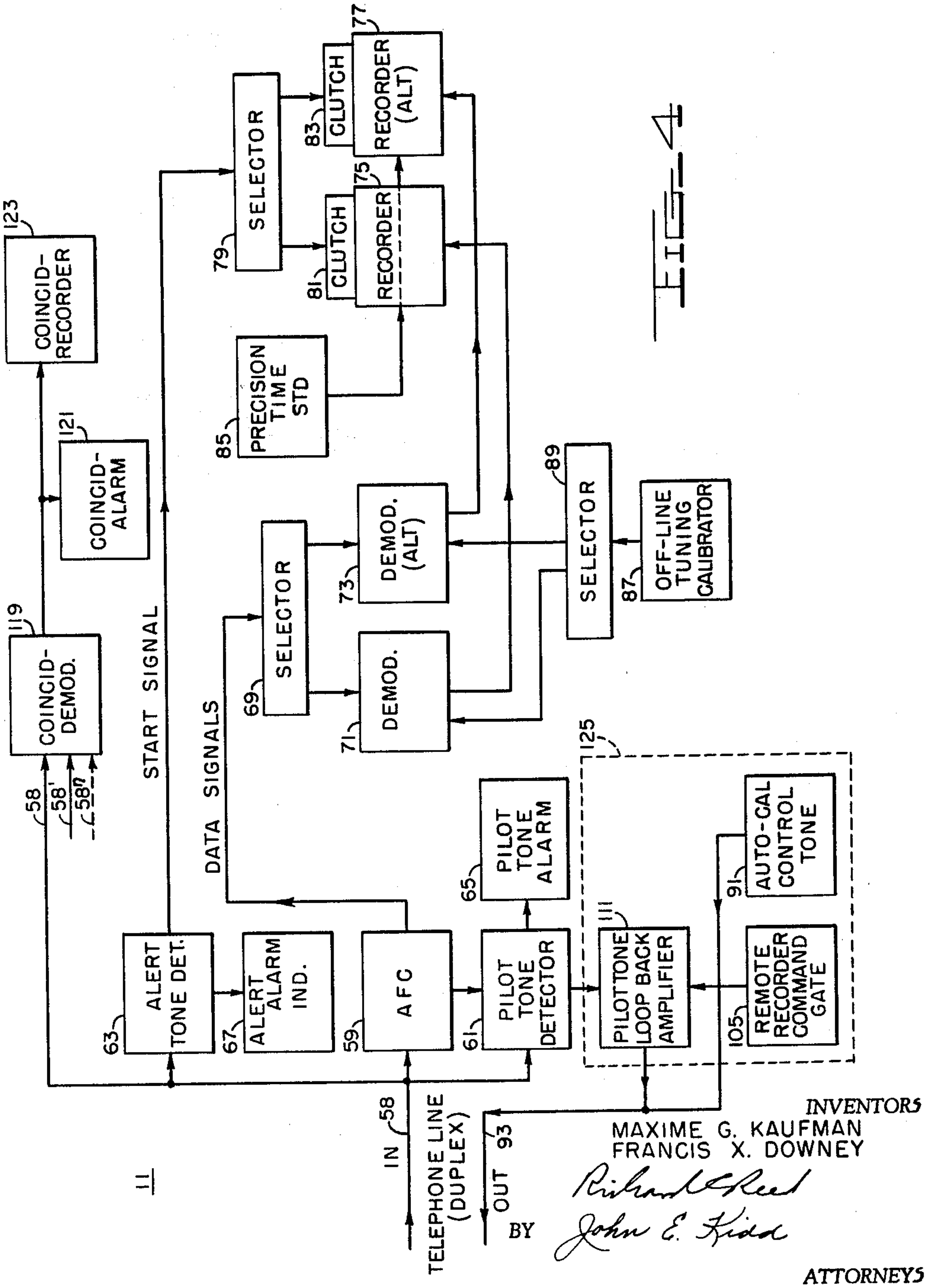
FIG. 4 is a logic diagram of the receiving end of one data line according to the principles of this invention.

A completed data transmission system showing the required logic for transmitting over one data line in accordance with the principles of this invention is shown in FIGS. 3 and 4. For every additional data line required, the logic has been duplicated except for standby or alternative equipment and the calibration equipment located at the central location site 11 which may be used in common with all the telephone lines.

Considering first the logic for the remote or data sending site 10 in detail, the surveillance system for detecting earth satellites at various remotely located sites is generally shown by block 20. Here an antenna system 22 receives radio energy from satellites passing through the electromagnetic energy fence which is processed by the RF system 24 in order to develop data signals 26.

The data signals 26 and a reference signal 28 are then directly fed through an on-line calibrator 32 and then to the phase meters 30 which converts the phase difference between the data signals 26 and the reference signal 28 into an analog voltage. The on-line calibrator 32 interrupts both the data signals 26 and the reference signal 28 sequentially in such a manner that the phase meters 30 are calibrated for a minimum and maximum analog output without interfering with the detection capability of the surveillance system. The analog data signals are then applied to selector switch 34 which feeds the signal to data transmitting unit 38, and to selector switch 36 which selects either recorder 75' or recorder 77' for recording the signals at the remote site. The recorders are standby apparatus and will not record unless their respective clutches 108 and 110 have been armed and triggered.

Transmitting unit 38 is composed of carrier frequency transmitter 40 an auxiliary transmitter 42, both of which are voltage controlled oscillators, a stable pilot oscillator 44 and 44' generating a pilot tone at 2750 c.p.s., and a stable oscillator 46 and 46' generating a signal tone at 1970 c.p.s.

When selector 34 switches the D.C. analog data signals to one of the two transmitters 40 or 42, the data signals frequency modulate the generated carrier frequency in each of the eight channel bandwidths. The modulated carrier signals, the pilot tone from oscillator 44 and the alert tone from generator 46, are then fed to outgoing telephone line 58 as a composite signal.

Returning momentarily, to the RF system 20, whenever a signal meeting pre-set requirements is detected, and RF alert command signal is actuated for the duration of this detected signal. The RF alert command signal is then introduced into the data transmission system by preselector 48 which activates an alert interval timer 50. Whenever preselector 48 fires, unit 50 initiates a command signal to both the standby recorders 75' and 77' and the transmitter unit 38. The command signal sent to oscillator 46 over lead 54 shorts out the 1970 c.p.s. tone so that it is no longer part of the composite signal on outgoing line 58. This method provides for a fail safe approach in that the tone will never interfere with the data carriers, since it is being transmitted to the central site 11 at all times except when the system is alerted to read out data. It is a lack of this signal when detected at the central location, that acts as a command alerting the central site when data signals are being transmitted. An alert alarm indicator is provided at both the transmitting and detecting site 10 and at the central receiving location 11.

The composite signal from transmitting unit 38 is then carried over line 58 and received by the central location 11 (FIG. 4) at the automatic frequency control unit 59. The AFC unit 59 provides the central receiving site 11 with a monitor, an alarm and a control device that will sense any change in frequency of the data carrier signals that may have occurred through the transmission media.

The pilot tone frequency of 2750 c.p.s. when received at site 11, provides a control frequency for the AFC system 59 for eliminating any deviations in the data carrier signals that may be introduced by the transmission media. The pilot tone is then used as a reference signal capable of being monitored by the AFC unit 59. A control voltage of 0.5 volt per cycle-deviation from this reference signal is produced across a balanced output of unit 59. This control voltage is adequate to compensate for any transmission line frequency shift. The response of the AFC system is adequate to compensate for any unwanted frequency modulation of the data carrier signals due to the telephone link carrier equipment and since with appropriate clipping apparatus the signal transmitted has been made immune to amplitude modulation as normally experienced on voice quality telephone duplex lines, the only other source of error other than a complete breakdown of the lines has been eliminated.

The pilot tone while being monitored by AFC 59 is also impressed on outgoing line 93 by loop back amplifier 111. The pilot tone is then looped back to remote site 10 to either indicate that the data is being received at central site 11 or to provide a command signal for automatically starting the remote site standby recorders 75¹ and 77¹.

At the same time, the composite signal on incoming line 58 is fed to an alert tone detector 63 and a pilot tone detector 61. Each detector is also provided with their own respective alarm indicators 65 and 67. Whenever the Alert tone from generator 46 is shorted out of the composite signal at the remote site alert detector 63 is actuated, alarm 67 indicates this condition and a start signal is sent to selector 79 which will trigger either the clutch 81 of recorder 75 or clutch 83 of recorder 77 preparing them for data channel recording.

While AFC 59 is detecting any change in frequency, the pilot tone detector 61 is noting any change in amplitude and any unacceptable change in either is indicated by the pilot tone alarm 65. As long as the reference signal is being received from the remote site the alarm indicates that it is being monitored, while loss of this signal should the line become open or degraded beyond a specific tolerance, is used as an alarm to alert the site of this condition.

After monitoring the composite signal by AFC unit 59 the data signals are fed to a manually operated switching network 69 which selects either demodulator circuit 71 or alternate demodulator 73. The demodulators detect the data line FM carrier signals and convert the carriers into data analog voltage signals. The outputs of the demodulators are balanced and designed to deliver 20 volt peak to peak output signals when the carriers are deviated from one edge to the other of the carrier bands. The analog signals are then sent to either recorder 75 or 77 depending upon which clutch 81 or 83 has been armed by switch 79, for data channel recording. The precision time standard 85 furnishes an accurate real time code for calibrating both recorder 75 and alternate recorder 77. The alternate units 73 and 77 are incorporated with the time standard and calibrated so that at all times there is a complete data reception system set up and available for use without interfering with the continual flow of data.

The recording equipment 75′ and 77′ and time standard 85′ (FIG. 3) located at each remote site is identical to the recording equipment 75, 77 and 85 at the central site, for reasons more fully explained in the description to follow.

Since the transmission link between sites 10 and 11 is a duplex line and since the composite signal is traveling in only one direction there is a return line 93 available. It is over this line that command and calibration controls from the central location site 11 are transmitted back to the remote site 10.

For proper data transmission it is essential that the data information at the remote site 10 be calibrated so as to provide a standard to compare with at the central data reduction site 11. The calibration techniques take two forms: an on-line calibration by unit 30 for conditioning the data to the entire surveillance system and an off-line calibration by 87 and 88 for conditioning the equipment to its environment and transmission media.

The automatic calibration unit 32 provides a three point calibration for the data transmission system and takes the form of a minimum and maximum signal through the phase meters 30 which provides a calibration mark at each end of a channel bandwidth and a midpoint calibration mark (or zero phase) which is generated by RF system 24 when actuated by autocalibration unit 32 through lead 90. This calibration is derived from the active components of the surveillance system and occurs sequentially over a period of time such a short duration (0.2 sec.), that effectively there is no interference with the continuous flow of data information. From this calibration all data is measured so that any drift incurred in the data system terminal equipment can be detected and compensated for in the readout data. The on-line calibrating unit 32 is actuated by a command signal that energies clutch 120.

The calibration is initiated periodically by an hourly command from a clock source 102 through OR gates 96 and Inhibitor 98. The calibration can also be initiated by a manual calibration command from unit 100 at the remote site or from the central site by automatic-calibration control generator 91. Control unit 91 inserts a 1000 c.p.s command tone on line 93 which acitvates the remote command unit 94. Generator 105 produces a tone which pulse modulates the pilot tone being looped back to the remote site over line 93. When the pulse modulated signal is actuated, alarm 92 is employed to indicate such procedures from the central site 11, and the pulse modulated signal either arms or triggers AND gate 118.

Inhibiting circuit 98 has been incorporated into the circuit so as to block any on-line calibration whenever satellite data information is being detected and is accomplished by having Alert Internal Timer 50 send a pulse to inhibitor 98 thru lead 104 thereby blocking automatically the calibration command during any period an alert is detected.

Off-line calibration techniques have been employed at both the remote sites and the central site so that alternate data transmitting and receiving equipment can be maintained in a constant readiness for switching to an active status. This provides a system for calibrating at any site, at any time without interfering with the on-line data system and allows the errors that may be introduced into the system to be held to less than 2 percent. A separate source of standard frequencies in calibrator 87 is included for periodic checking and maintenance of the off-line equipment at the receiving end 11. This is accomplished without the loss of data by incorporating into the system selector switch 89. A standard voltage source 88 is used for off-line calibration of the transmitting equipment which simulates minimum and maximum levels of phase meter information. All the units at the remote site are initially adjusted to this standard and a selector is provided for switching this standard into the off-line calibrating equipment without interfering with the data flow. Thus it is possible to condition to a standard both the data information signals and the equipment.

To indicate a mode of operation at the remote site 10 from the central site 11, a command transmitter unit 125 is employed in the system. This unit provides a loop back circuit 111 for returning the pilot tone back to the remote site 10 over line 93. If the pilot tone from oscillator 44 is impaired beyond acceptable limits, alarms 65 and 116 at both the central site and the remote site are actuated by what can be considered a loss of pilot tone due to either a frequency shift or catastrophic type failure. When this occurs detector 61 triggers alarm 65 at the central site, gates amplifier 111 and sends a signal by line 93 to remote site 11. At remote site 11, detector 114 triggers alarm 116 and arms AND gate 118. If the interval timer 50 is actuated by an RF Alert Command, AND gate 118 will be triggered sending a command signal to OR gate 106 which actuates clutch 108 or alternative clutch 110. Actuating either clutch, turns on recorder 75′ or recorder 77′ respectively. With this arrangement, any satellite data information that subsequently arrives after the interruption occurs in the transmission media will be automatically recorded at the remote site. Recording at the remote site is then continued until the transmission line interruption has been alleviated and the system returned to normal operation. Under normal operations wherein data recorded only at the central site, OR gate 106 is used in the system so that the remote sites data recorder, either 75′ or 77′, will be turned on whenever an ON-Line calibration command is initiated through Auto Timer 102, Manual Cal Command 100 or Remote Cal Command 94, or whenever the Manual recorder ON command 112 is initiated.

It is also possible to command other specific operations at the remote sites by applying different modulations on the looped back signal. When an on-line calibration is required, transmitter unit 125 adds to the looped back signal a tone from generator 91. This actuates remote command unit 94 which sends a command signal to OR gate 96 thereby triggering clutch 120, provided that it is not being inhibited by the Aletrt Interval Timer 50.

The recorders 75' and 77' can also be armed from central site 11, whenever necessary, by pulse modulating the looped back signal from 111 by a gate from generator 105.

Another feature combined within the data transmission system for properly analyzing the detected data from surveillance system 20 is a coincidence recording system for continuously monitoring together all the channels from each remote site. Here the composite signal from all remote sites are connected to coincidence demodulting circuitry 119 which discriminates between the various incoming signals to site 11 and sends the data to a coincidence recording apparatus 123 whereby the remote side data channels can be correlated with the other remote stations on one recording. Coincidence Alarm 121 can take the form of a gate that requires the presence of alert signals from two sites simultaneously.

Figure 5:
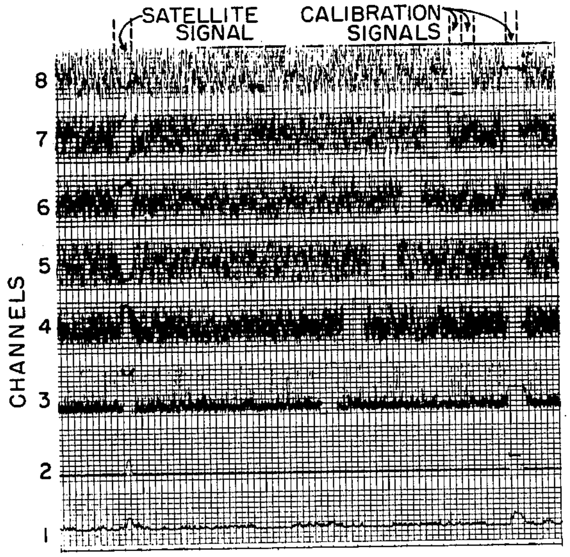
FIG. 5 is a sample of a typical satellite signal recording as seen at the remote location or sending end of the system.
Figure 6:
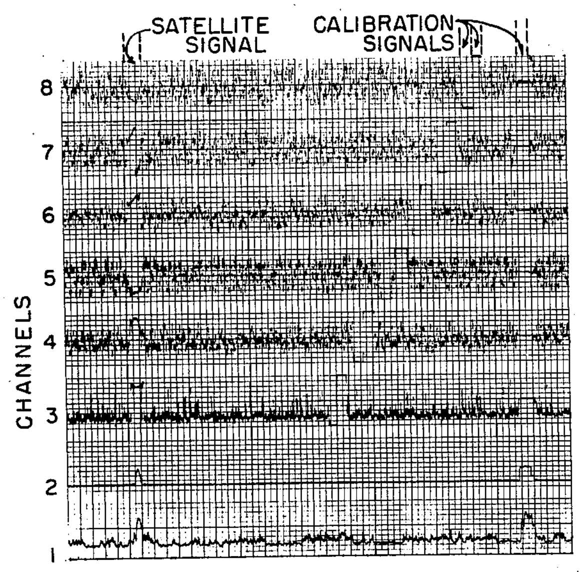
FIG. 6 is a sample of the same satellite signal, shown in FIG. 5, as it is recorded at the central location or receiving end of the system.

FIGS. 5 and 6 represent an actual section of a paper recorder of a satellite signal and a calibration signal. So to illustrate the high degree of fidelity possible with this data transmission system. FIG. 5 shows the satellite signal on the left as originally received at a remote site and on the right the three point calibration originating from the same site. FIG. 6 shows the same signal as shown in FIG. 5 only recorded at a central site a thousand miles away from the remote site, in real time after transmission through the data system. The sequential calibration of each channel may be appropriately seen in FIG. 6. Here, the calibration signals first appear at generally the center of channel 3 and as the signals are sequentially impressed on each succeeding channel, the calibration signal for each channel can be seen as moving progressively a proportional amount to the right.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. In a multichannel communications system for transmitting data in real time between several remote sites and a central site, the combination of, means at each remote site for developing audio data signals, means at each remote site for grouping said signals into distinct channels of communication, each channel having means for sequentially and periodically calibrating the audio data signal, means for providing a carrier frequency signal, means for modulating said carrier frequency by said calibrated audio data signal, means for providing an alert signal each time said channels carries an audio data signal, means associated with said channels for providing an unmodulated pilot signal, means for interrupting said alert signal, means for transmitting simultaneously the modulated carrier frequency and the unmodulated pilot signal between each remote site and said central site, amplifying means at said central site for amplifying and demodulating said carrier frequency, means connected to said central site for monitoring said alert signal and said pilot signal, means connected to said amplifying and demodulating means for recording said audio data signals and means connected between said monitoring means and said recording means for preparing said recording means.

2. In the multichannel communications system as set forth in claim 1 wherein means are provided at the central site for continuously monitoring all of the channels from each remote site.

3. In the multichannel communications system as set forth in claim 1 wherein means are provided for recording the audio data signals at each remote site and command means located at said central site for remotely operating said remote site recording means.

4. In the multichannel communications system as set forth in claim 3 wherein said command means includes means for remotely operating said calibration means.

5. In the multichannel communications system as set forth in claim 4 wherein alarm indicating means are provided at both the central site and each of the remote sites for indicating the condition of the transmitting media.

6. In an FM multiplex channel system for continuously transmitting data in real time wherein a plurality of channels containing audio data are transmitted over a 3000 cycle voice band comprising means for detecting and generating audio data signals, means for providing at least a two point calibration of each audio data signal without interferring with the continual flow of data, carrier frequency means, means for modulating said carrier frequency by said audio data signals, means for providing an unmodulated pilot signal, means for providing an alert signal each time data is detected, means for simultaneously transmitting the unmodulated signal and the modulated signal from a remote location to a central location, means for demodulating said carrier frequency, monitor means for monitoring said pilot signal and said alert signal, means coupled to said demodulating means for recording said audio data signals and command means at said remote central location for actuating said calibration means.

7. In the systems as set forth in claim 6 wherein offline calibration means are provided for conditioning the system to its environment and transmission media.

8. In a multichannel carrier system for transmitting data continuously and in real time, the combination of, a plurality of remote stations, each station comprising means for providing audio data information, alert means for providing an alert command signal when audio data information is available from the detecting means, means for calibrating said audio data information, means for modulating a carrier frequency by said audio data information, a central station, voice quality communication lines for transmitting the alert command signal and said modulated signal between said remote stations and said central station, said central station comprising means for demodulting said modulated signal, means for recording said demodulated signal, monitoring means for detecting said alert command, means connected between said monitoring means and said recording means for arming said recording means, command means at said central location generating command signals, said signals being transmitted to the respective remote stations, recorder means at said remote stations wherein said command signals cause said recorders to record said audio data information.

9. In the carrier system as set forth in claim 8 wherein each remote station has a pilot signal means for generating an unmodulated signal that is simultaneously transmitted with said modulated signals and means at said central location for monitoring said pilot signal.

10. In the carrier system as set forth in claim 8 wherein means are provided for automatically arming said remote location recorders should the pilot signal be lost.

11. The method of transmitting data continuously between several remote locations and a central location which includes the steps of developing at each remote location data information, converting said information into audio signals, generating an alert signal everytime an audio signal is developed, calibrating said audio signal, generating a carrier frequency, modulating said carrier frequency by said audio signal, generating a pilot signal, simultaneously transmitting all of said signals to the central location, monitoring each signal, demodulating said carrier frequency, preserving the demodulated signal by recording apparatus, arming the recording apparatus by said alert signal, and transmitting said pilot signal back to said remote location.

12. In accordance with the method set forth in claim 11 the added steps of developing a command signal at said central location, transmitting said command signal to said remote location and remotely calibrating said data information.

13. In accordance with the method set forth in claim 11, the added steps of preserving the data signals at the remote site by recording apparatus and automatically arming said recording apparatus whenever the pilot signal is interrupted.

14. In a multichannel carrier system for transmitting data continuously and in real time, the combination of, a plurality of remote stations each station comprising means for providing a source of audio data information, means for calibrating said audio data information, means for generating a carrier frequency, means for modulating said carrier frequency by said data information, means for generating a pilot tone at each remote station, a central station, voice quality telephone lines for transmitting said modulated signal and said pilot tone between said remote stations and said central station, said central station comprising automatic frequency control means for monitoring said transmitted signal, means for detecting said pilot tone, a second voice quality telephone line for connecting said central station to each remote station, loop back amplifying means for sending said pilot tone back to said remote stations, detecting means for demodulating said carrier frequency, recording means at both the central station and at the remote stations, means connecting said demodulating carrier frequency means to the recording means at said central location and means for detecting said pilot tone at said remote stations and further means at said remote stations for automatically sending the data information to the recording means located at the remote stations whenever the pilot tone is interrupted.

15. In the carrier system as set forth in claim 14 wherein said central station includes command means for modulating said pilot tone transmitted between said central station and said remote stations and alarm means for indicating the condition of said telephone lines.

16. In the carrier system as set forth in claim 14 wherein each station is provided with off-line means for calibration whereby the respective equipment at each station may be calibrated independently of the source of audio data information.

17. In the carrier system as set forth in claim 16 wherein coincidence means are provided at the central station for monitoring all of the remote stations at one time.

18. The method of multichannel communications for utilizing the data contained in an RF signal which comprises the steps of developing an alert signal each time RF signals are detected, developing from said detected signal a plurality of audio data signals of different channels of communication, sequentially and momentarily interrupting each channel, sequentially inserting a calibration signal upon each channel of audio data during the momentary interruption, converting the audio data on each channel to a D.C. analog signal, modulating a carrier frequency by each analog signal, combining an unmodulated pilot signal with said modulated carrier frequency to form a composite signal, interrupting said alert signal, transmitting said composite signal over a voice quality telephone line from a sending site, receiving said composite signal at a distant receiving site, monitoring said alert signal at said receiving site, amplifying said modulated carrier frequency, demodulating said carrier frequency and deriving D.C. analog signals, recording said D.C. analog signals, preparing said recording means by said alert signal and returning said pilot signal to said sending site to indicate that said composite signal is being received at said receiving site.

References Cited by the Examiner

UNITED STATES PATENTS 2,719,284 9/55 Roberts et al. ---------- 340—182

DAVID G. REDINBAUCH, *Primary Examiner.*